United States Patent
Cossman et al.

(10) Patent No.: US 10,417,497 B1
(45) Date of Patent: Sep. 17, 2019

(54) COGNITIVE LOAD REDUCING PLATFORM FOR FIRST RESPONDERS

(71) Applicant: QWAKE TECHNOLOGIES, San Francisco, CA (US)

(72) Inventors: Sam J. Cossman, San Francisco, CA (US); John Davis Long, II, New York, NY (US); Omer Haciomeroglu, San Francisco, CA (US); Michael E. Ralston, Mountain View, CA (US)

(73) Assignee: QWAKE TECHNOLOGIES, San Francisco, CA (US)

( * ) Notice: Subject to any disclaimer, the term of this patent is extended or adjusted under 35 U.S.C. 154(b) by 0 days.

(21) Appl. No.: 16/398,102

(22) Filed: Apr. 29, 2019

Related U.S. Application Data

(60) Provisional application No. 62/758,438, filed on Nov. 9, 2018, provisional application No. 62/758,457, filed on Nov. 9, 2018.

(51) Int. Cl.
*G06Q 40/08* (2012.01)
*G06K 9/00* (2006.01)
(Continued)

(52) U.S. Cl.
CPC ..... *G06K 9/00671* (2013.01); *G06F 3/04817* (2013.01); *G06K 9/6288* (2013.01);
(Continued)

(58) Field of Classification Search
CPC .................................................. G06K 9/6288
(Continued)

(56) References Cited

U.S. PATENT DOCUMENTS

| 5,778,092 A | 7/1998 | MacLeod |
|---|---|---|
| 6,195,467 B1 | 2/2001 | Asimopoulos |

(Continued)

FOREIGN PATENT DOCUMENTS

| EP | 1659890 B1 | 1/2009 |
|---|---|---|
| WO | 2017/130184 A1 | 8/2017 |
| WO | 2018/167771 A1 | 9/2018 |

OTHER PUBLICATIONS

Year 2010, Reducing Cognitive Load in Mobile Learning: Activity-centered Perspectives, lianzhen Chen.*
(Continued)

*Primary Examiner* — Javid A Amini
(74) *Attorney, Agent, or Firm* — Schwabe Williamson & Wyatt, PC

(57) ABSTRACT

A cognitive load reducing platform comprises one or more sensors that collect information about an environment as sensor data. A processor is in communication with the one or more sensors, wherein the processor executes a cognitive enhancement engines that processes the sensor data into enhanced characterization data having a reduced amount of data compared to the sensor data. An output device electronically communicate the enhanced characterization data to a user such that the enhanced characterization data reduces the cognitive load of the user, wherein the sensor and the output device comprise an assisted perception module worn by the user during an incident. A command interface device remote from the user to enable a person of authority to manage the incident and the user by receiving and displaying the enhanced characterization data, and by transmitting data and commands back to the assisted perception module.

18 Claims, 6 Drawing Sheets

(51) Int. Cl.

| | | |
|---|---|---|
| *H04N 5/33* | (2006.01) | |
| *G06K 9/62* | (2006.01) | |
| *G06F 3/0481* | (2013.01) | |
| *G06T 5/00* | (2006.01) | |
| *G06T 5/50* | (2006.01) | |
| *G08B 7/06* | (2006.01) | |
| *H04W 4/38* | (2018.01) | |
| *H04W 4/024* | (2018.01) | |
| *H04L 29/08* | (2006.01) | |

(52) U.S. Cl.
CPC ............... *G06T 5/003* (2013.01); *G06T 5/50* (2013.01); *G08B 7/066* (2013.01); *H04L 67/12* (2013.01); *H04N 5/33* (2013.01); *H04W 4/024* (2018.02); *H04W 4/38* (2018.02); *G06T 2207/10048* (2013.01); *G06T 2207/20192* (2013.01)

(58) Field of Classification Search
USPC ......................................................... 345/633
See application file for complete search history.

(56) References Cited

U.S. PATENT DOCUMENTS

| | | |
|---|---|---|
| 6,611,618 B1 | 8/2003 | Peli |
| 6,891,966 B2 | 5/2005 | Chen |
| 6,898,559 B2 | 5/2005 | Saitta |
| 6,909,539 B2 | 6/2005 | Korniski |
| 7,085,401 B2 | 8/2006 | Averbuch |
| 7,190,832 B2 | 3/2007 | Frost |
| 7,377,835 B2 | 5/2008 | Parkulo |
| 7,430,303 B2 | 9/2008 | Sefcik |
| 7,460,304 B1 | 12/2008 | Epstein |
| 7,598,856 B1 | 10/2009 | Nick |
| 8,054,170 B1 | 11/2011 | Brandt |
| 8,463,006 B2 | 6/2013 | Prokoski |
| 8,836,793 B1 | 9/2014 | Kriesel |
| 9,177,204 B1 | 11/2015 | Tiana |
| 9,498,013 B2 | 11/2016 | Handshaw |
| 9,728,006 B2 | 8/2017 | Varga |
| 9,729,767 B2 | 8/2017 | Longbotham |
| 9,875,430 B1 | 1/2018 | Keisler |
| 9,995,936 B1 | 6/2018 | Macannuco |
| 9,998,687 B2 | 6/2018 | Lavoie |
| 10,042,164 B2 | 8/2018 | Kuutti |
| 10,089,547 B2 | 10/2018 | Shemesh |
| 2003/0190090 A1 | 10/2003 | Beeman |
| 2007/0257934 A1 | 11/2007 | Doermann |
| 2008/0092043 A1* | 4/2008 | Trethewey ............ G06F 1/1626 715/705 |
| 2008/0146334 A1* | 6/2008 | Kil ........................ G06Q 40/08 463/36 |
| 2015/0025917 A1* | 1/2015 | Stempora ............... G06Q 40/08 705/4 |
| 2015/0067513 A1* | 3/2015 | Zambetti ............... G06F 3/0482 715/716 |
| 2015/0244946 A1 | 8/2015 | Agaian |
| 2015/0302654 A1 | 10/2015 | Arbouzov |
| 2015/0339570 A1* | 11/2015 | Scheffler .................. G06N 3/10 706/16 |
| 2016/0260261 A1 | 9/2016 | Hsu |
| 2016/0295208 A1 | 10/2016 | Beall |
| 2016/0350906 A1 | 12/2016 | Meier |
| 2016/0360382 A1* | 12/2016 | Gross .................... G06F 3/0488 |
| 2017/0123211 A1 | 5/2017 | Lavoie |
| 2017/0192091 A1 | 7/2017 | Felix |
| 2017/0224990 A1* | 8/2017 | Goldwasser ....... A61N 1/36025 |
| 2017/0251985 A1* | 9/2017 | Howard .............. A61B 5/7282 |
| 2018/0165978 A1* | 6/2018 | Wood ................. G05B 19/0423 |
| 2018/0189957 A1 | 7/2018 | Sanchez-Bermudez |
| 2018/0241929 A1 | 8/2018 | Bouzaraa |

OTHER PUBLICATIONS

Year 2006; Reducing Cognitive Overload by Meta-Learning Assisted Algorithm Selection, Lisa Fan, Minxiao Lei.*

Year 2012; Towards Reducing Cognitive Load and Enhancing Usability Through a Reduced Graphical User interface for a Dynamic Geometry System: An Experimental Study, Helena M. Reis et al.*

Bretschneider et al., "Head Mounted Displays for Fire Fighters" 3rd International Forum on Applied Wearable Computing 2006; 15 pages.

Gimel'farb Part 3: Image Processing, Digital Images and Intensity Histograms; COMPSCI 373 Computer Graphics and Image Progessing; University of Auckland, Auckland, NZ; Date unknown; 57 pages.

Haciomeroglu, "C-thru smoke diving helmet" Jan. 8, 2013; 15 pages; behance.com <http://www.behance.net/gallery/6579685/C-Thru-Smoke-Diving-Helmet>.

Haciomeroglu, "C-thru smoke diving helmet" Jan. 8, 2013, 14 pages; coroflot.com <https://www.coroflot.com/OmerHaciomeroglu/C-Thru-smoke-diving-Helmet>.

McKinzie, "Fire Engineering: The Future of Artificial Intelligence in Firefighting" Oct. 25, 2018; available at <https://www.fireengineering.com/articles/2018/10/artificial-intelligence-firefighting.html>; 16 pages.

Wu et al., "Contract-Accumulated Histogram Equalization for Image Enhancement", IEEE SigPort, 2017. [Online]. Available at <http://sigport.org/1837.

Wu, "Feature-based Image Segmentation, Texture Synthesis and Hierarchical Visual Data Approximation" University of Illinois at Urbana-Champaign, Apr. 2006; 61 pages.

Chen, "Reducing Cognitive Load in Mobile Learning: Activity-centered Perspectives" Published in International Conference on Networking and Digital Society; DOI: 10.1109/ICNDS.2010.5479459; pp. 504-507 (2010).

Thomsen-Florenus, "Thermal Vision System" Berlin, Germany; Dec. 2017; 7 pages.

* cited by examiner

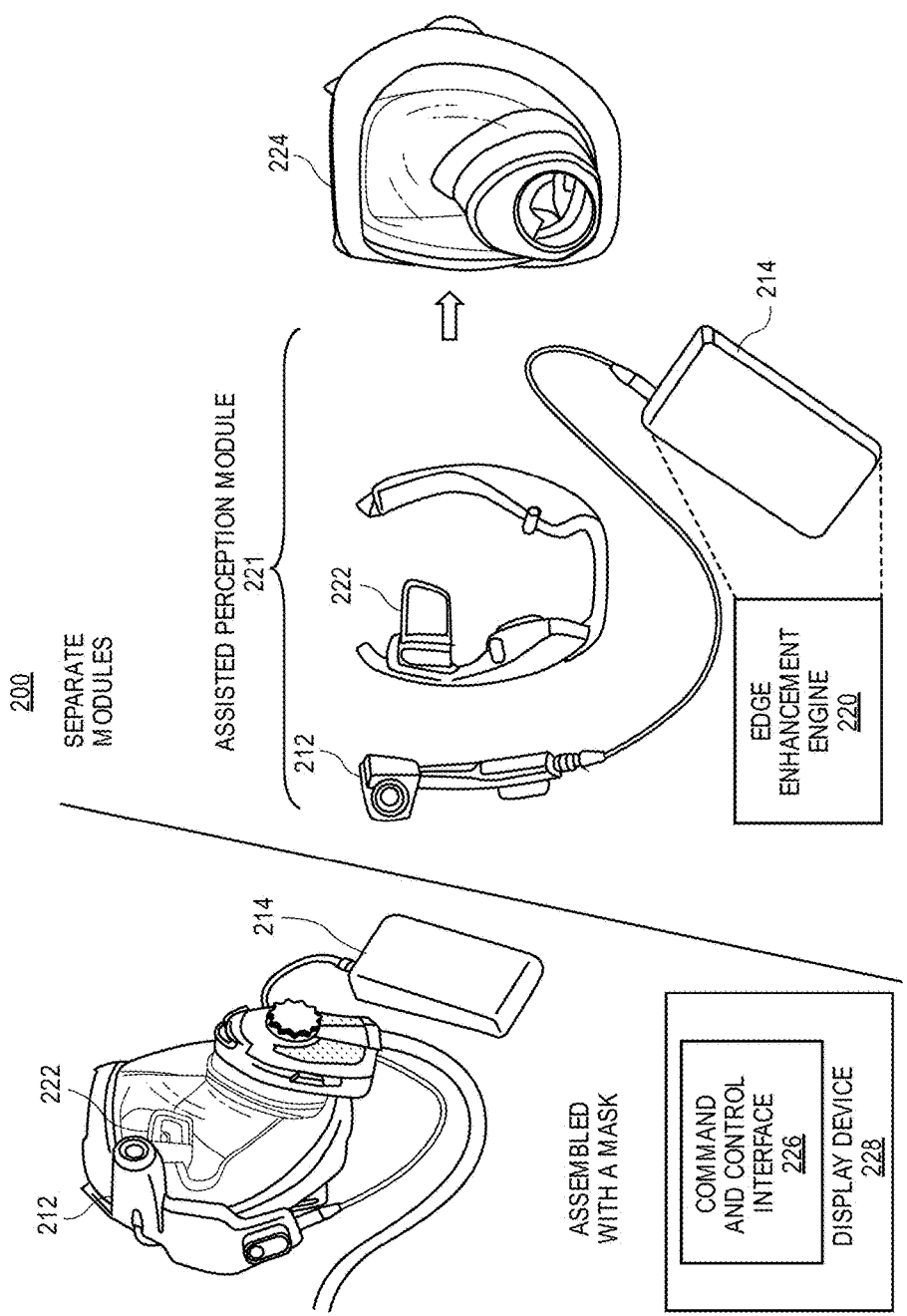

FIG. 3A        FIG. 3B
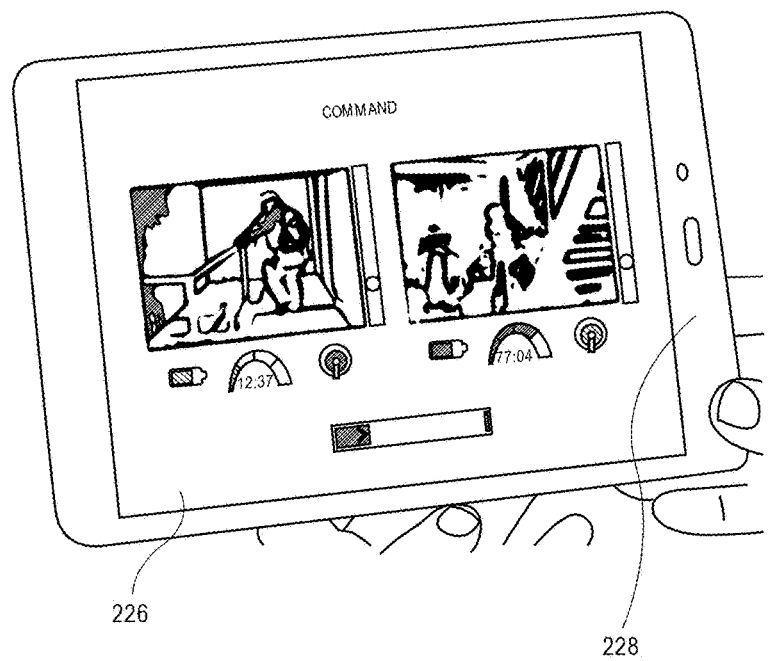
FIG. 4

COGNITIVE LOAD REDUCING PLATFORM FOR FIRST RESPONDERS

CROSS-REFERENCE TO RELATED APPLICATIONS

This application claims the benefit of provisional Patent Application Ser. No. 62/758,438, filed Nov. 9, 2018; and to Patent Application Ser. No. 62/758,457, filed Nov. 9, 2018, both assigned to the assignee of the present application, and incorporated herein by reference.

TECHNICAL FIELD

The present invention relates to a cognitive load reducing platform for first responders that leverages the principles of neuroscience and the techniques of computer vision to reduce the cognitive load placed upon a user and elevates human performance in high stress environments.

BACKGROUND

In high stress and oftentimes hazardous work environments-including firefighting, search & rescue, oil and gas, surgery, fighter pilots, mining, special ops, and the like, one false step has critical consequences, but so do too many slow steps. Go too fast and something life-threatening may be missed; go too slow and the results could be doubly devastating. The challenges of effectively and safely performing critical work in harsh and obscured environments have always existed. These challenges combine the physical strain imposed by hazardous terrain with the mental distress placed upon the individual operating within them. Critical human performance in high-stress environments is limited by how rapidly and effectively the brain can process impoverished or jumbled sensory inputs. Until now technology has been leveraged primarily to increase the amount of information provided to the senses, but not designed to specifically enhance the brain's existing (and unmatched) cognitive ability to make sense of that information.

For example, several emergency response systems are centered on the use of thermal imaging cameras (TICs) and augmented reality (AR) optics to provide a hands-free thermal display to the user. Current systems are typically carried by a crewmembers who must iteratively scan, mentally process and communicate what they perceive. Current handheld and hands-free TICs lack the computational resources and software required to unobtrusively offer advanced image processing and data visualization features to all crewmembers in real-time. This capability and time gap in the visual understanding of hazardous environments has been identified as a significant causative factor in responder line of duty deaths. Such systems cause crewmembers, such as first responders, to operate in a Stop, Look, Process and Remember paradigm, which is cumbersome and time consuming.

Accordingly, there is a need for improved methods and systems for integrating components such as a TIC and AR optics, with a government certified or compliant face mask, such as a self-contained breathing apparatus (SCBA), such that the SCBA retains its certification after the integration.

BRIEF SUMMARY

The exemplary embodiment provides a cognitive load reducing platform for first responders that incorporates contextual and physiological visualizations delivered via electronic communications designed to reduce cognitive load and elevate performance. Aspects of the cognitive load reducing platform include one or more sensors that collect information about an environment as sensor data. A processor complex comprising one or more processors is in communication with the one or more sensors, wherein the one or more processors execute one or more software-based cognitive enhancement engines that process the sensor data from the one or more sensors into enhanced characterization data having a reduced amount of data compared to the sensor data. One or more output devices electronically communicates the enhanced characterization data to a user such that the enhanced characterization data is integrated into natural senses of the user and optimized for the performance of a specific task of the user to reduce the cognitive load of the user, wherein at least one of the one or more sensors and at least one of the one or more output devices comprise an assisted perception module worn by the user during an incident. A command and control interface is displayed on a display device remote from the user to enable a person of authority to manage the incident and user by receiving and displaying the enhanced characterization data from the assisted perception module, and by transmitting data and commands back to the assisted perception module.

According to the method and system disclosed herein, the cognitive load reducing platform changes first responders' use of these technologies from the cumbersome, and information overloaded, Stop, Look, Process and Remember paradigm to a state of continuous assisted perception for all crewmembers. The platform dramatically enhances the user's ability to make well-informed decisions rapidly when operating in complex, stressful environments where cognitive abilities decline.

BRIEF DESCRIPTION OF SEVERAL VIEWS OF THE DRAWINGS

FIGS. 2A and 2B are diagrams illustrating components of the cognitive load reducing platform in the first responder embodiment.

FIGS. 3A and 3B are diagrams illustrating an example of enhanced wireframe images displayed on the display unit.

FIG. 4 is a diagram illustrating an example command and control interface of the cognitive load reducing platform.

DETAILED DESCRIPTION

Figure 1:
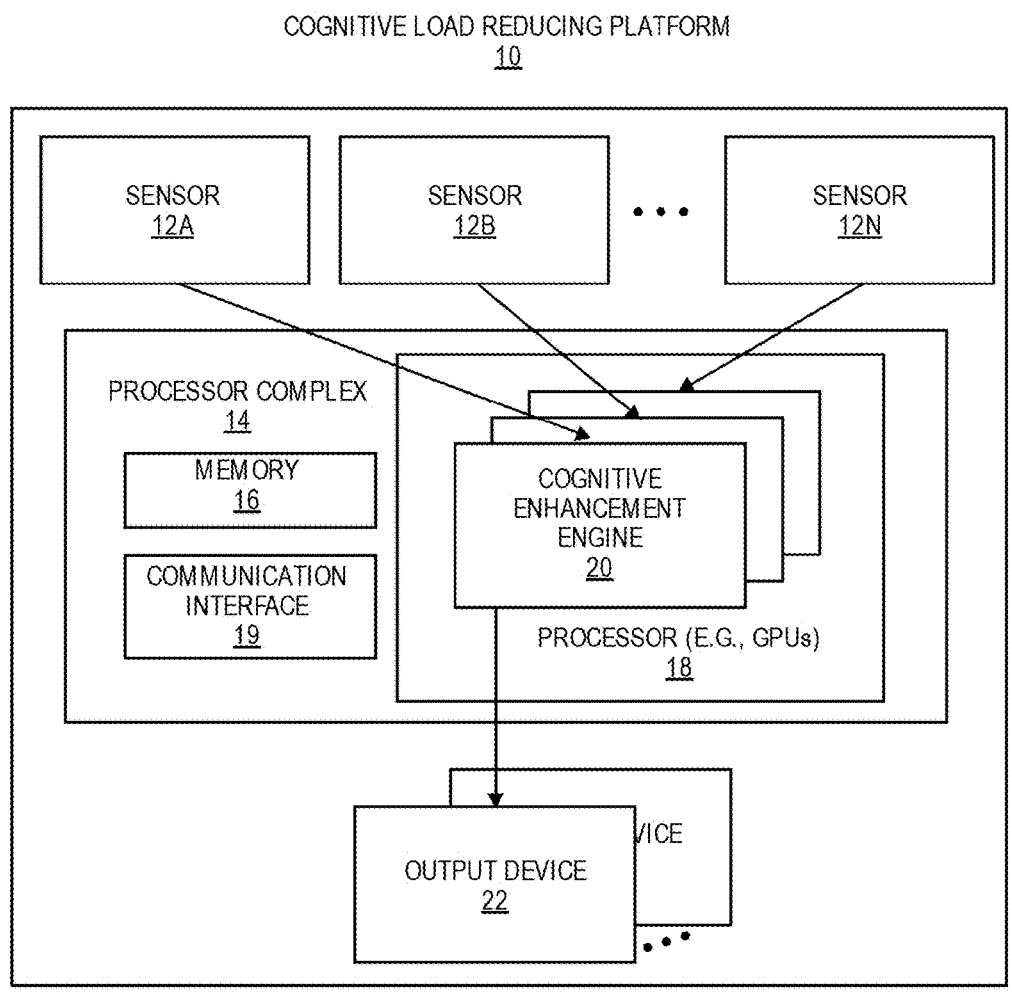
FIG. 1 is a diagram illustrating one embodiment of a cognitive load reducing platform according to one embodiment.

The exemplary embodiment relates to methods and systems for incorporating contextual and physiological visualizations into electronic communications via a cognitive load reducing platform. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

In many critical, high-stress activities, such as firefighting, specialized tools have been developed to support challenging environments and critical objectives of crewmembers engaged in the high-stress activities. For the most part, these tools have evolved to support the crewmembers' physical needs—heat protection, airway protection, forcible entry, fire suppression, and the like. In the past 10-15 years, a greater focus has been placed on supporting the crewmembers' informational needs, including hazardous environment detection, communication, and safety alerting. For example, hearing aids, binoculars, and seismic sensors all increase the collection of information, but don't increase crewmembers' abilities to process or critically discern that extra information. Polarized glasses, gas monitors, thermal imagers, and the like all collect information, but still do not address the time and stress penalty required to absorb and interpret all that information. This "more is better" approach is both distracting and inefficient.

Unfortunately, often times stress is the limiting factor to crewmembers successfully completing these critical and dangerous activities. These are, by definition, high-stress environments and the difficulty in absorbing more and more information is made worse by stress. The health of the crewmembers is also compromised by stress, and regrettably contributes to a majority of crewmembers fatalities every year.

The exemplary embodiments provide a cognitive load reducing platform that leverages the principles of neuroscience and the tools of computer vision to reduce the cognitive load of a user and elevate human performance in high stress environments. The principles of neuroscience are used to integrate sensor data into the natural senses in a manner that is optimized for the task at hand, e.g. search and rescue, and computer vision supplies the means in one embodiment. The cognitive load reducing platform significantly enhances the crewmembers' or user's ability to make well informed decisions rapidly when operating in complex environments where cognitive abilities decline. A premise of the cognitive load reducing platform is that if thinking and understanding are easier for crewmembers, then crewmembers can achieve objectives more rapidly, spend less time in harsh conditions, and have potentially reduced stress levels because of the real-time assurance or reinforcement of a human sense, i.e., vision, hearing and or touch. Example users of the cognitive load reducing platform include, but are not limited to, firefighters, surgeons, soldiers, police officers, search and rescue and other types of first responders.

FIG. 1 is a diagram illustrating one embodiment of a cognitive load reducing platform according to one embodiment. In one embodiment, the cognitive load reducing platform is a wearable electronic system worn on the body of a user when the user is engaged in complex, high stress environments that reduce cognitive abilities.

The cognitive load reducing platform 10 comprises, one or more sensors 12a-12n (collectively sensors 12) that collect information about an environment as sensor data. The information collected about the environment refers primarily to sensor data that can be used for navigation and detecting hazards, and also to a user's health status. In one embodiment, the sensors are worn by the crewmembers. For example, multiple sensors may be incorporated into a sensor package that is worn by one or more crewmembers. In another embodiment, other sensors may be remote from the crewmembers, such as on a drone equipped with a camera, toxicity detector, and the like.

Example categories of sensors includes situational awareness sensors and biometric sensors for health status. The situational awareness sensors measure data about the user's external environment for hazard detection and navigation. Examples of situational awareness sensors for hazard detection may include, but are not limited to: cameras (e.g., a TIC, a radiometric thermal camera, a drone camera), a spectrometer, a photosensor, magnetometer, a seismometer, a gas detector, a chemical sensor, a radiological sensor, a voltage detector, a flow sensor, a scale, a thermometer, a pressure sensor, and an acoustic sensor (e.g., for selective active noise cancellation inside the mask to facilitate radio communication). Examples of situational awareness sensors used for user navigation may include, but are not limited to: an inertial measurement unit (IMU), a GPS sensor, a speedometer, a pedometer, an accelerometer, an altimeter, a barometer, attitude indicator, a depth gauge, a compass (e.g., a fluxgate compass), a gyroscope, and the like. Examples of biometric sensors that measure health conditions/status of the user may include, but are not limited to: a heart rate sensor, a blood pressure monitor, a glucose sensor, an electrocardiogram (EKG or ECG) sensor, an electroencephalogram (EEG) sensor, an electromyography (EMG) sensor, a respiration sensor, and a neurological sensor.

The platform also includes a high-speed processor complex 14 coupled to the sensors 12. The high-speed processor complex 14 includes a memory 16, a communication interface 19, and one or more processors 18, such as graphics processor units (GPUs). The processor/GPUs 18 execute one more software-based cognitive enhancement engines 20 to process the sensor data from the sensors 12 into enhanced characterization data having a reduced amount of data compared to the sensor data and incorporates contextual and physiological visuals, auditory and/or haptic cues. The cognitive load reducing platform 200 is sensor agnostic and as any type of sensor can be added to the platform as long a corresponding cognitive enhancement engine 20 is provided to process and present that sensor data. The memory 16 may contain sensor data collected from the one or more sensors 12, and may store the cognitive enhancement engines 20 for implementing the processes described herein when executed by the one or more processors 18. Although the cognitive enhancement engines 20 are described as single modules, the functionality provided by each of the cognitive enhancement engines 20 may be performed by multiple modules.

The cognitive load reducing platform 10 further includes one or more output devices 22 coupled to the processor complex 14 to electronically communicate the enhanced characterization data to the user. In one embodiment, the output devices 22 may be implemented as a visual display, headphones/ear buds and/or a haptic device. The enhanced characterization data is thus integrated into natural senses of the wearer in a manner that is optimized for the performance of a specific task of the user—e.g., navigating in limited, to no, view environments.

Prior solutions increase the amount of information provided to the user's senses without specifically enhancing the brain's existing (and unmatched) cognitive ability to make sense of that information. The cognitive load reducing platform 10, in contrast, filters, summarizes, and focuses sensor data into the enhanced characterization data comprising contextual and physiological visuals, audio and/or haptic cues to create a new category called "Assisted Perception" that significantly reduces complexity and cognitive load (and accompanying stress)—and decreases Time-To-Clarity required to save lives. The cognitive load reducing platform 10 is designed to reduce risk, improve human safety, and save lives.

The cognitive load reducing platform supports the introduction of life-saving, Assisted Perception solutions to high-stress environments. One example use of this new category of Assisted Perception is as a firefighting vision system. In this embodiment, the cognitive load reducing platform is a real-time computer vision engine designed to aid first responders as they navigate smoke filled, hazardous environments with little or no visible light. In this embodiment, the cognitive load reducing platform increases the speed and safety of first responders in the field with a focus upon navigation and visual communication applications. The Assisted Perception of the cognitive load reducing platform dramatically enhances one's ability to make well informed decisions rapidly when operating in complex environments where cognitive abilities decline. The platform has shown performance improvements of 267% (e.g., reducing the time to complete mission critical search and rescue tasks from 4.5 mins to 1.7 mins).

Several emergency response systems are based on the use of a thermal camera and AR optics to provide a hands-free imaging system to the user. However, the cognitive load reducing platform provides a novel integrated design of these hardware and software elements into a system that efficiently integrates into natural human visual perception in a manner that decreases stress in the field. In the first responder embodiment, the platform combines a unique combination of enhanced thermal imaging, augmented reality (AR) or virtual reality (VR), and environment visualization and mapping capabilities.

Figure 2B:
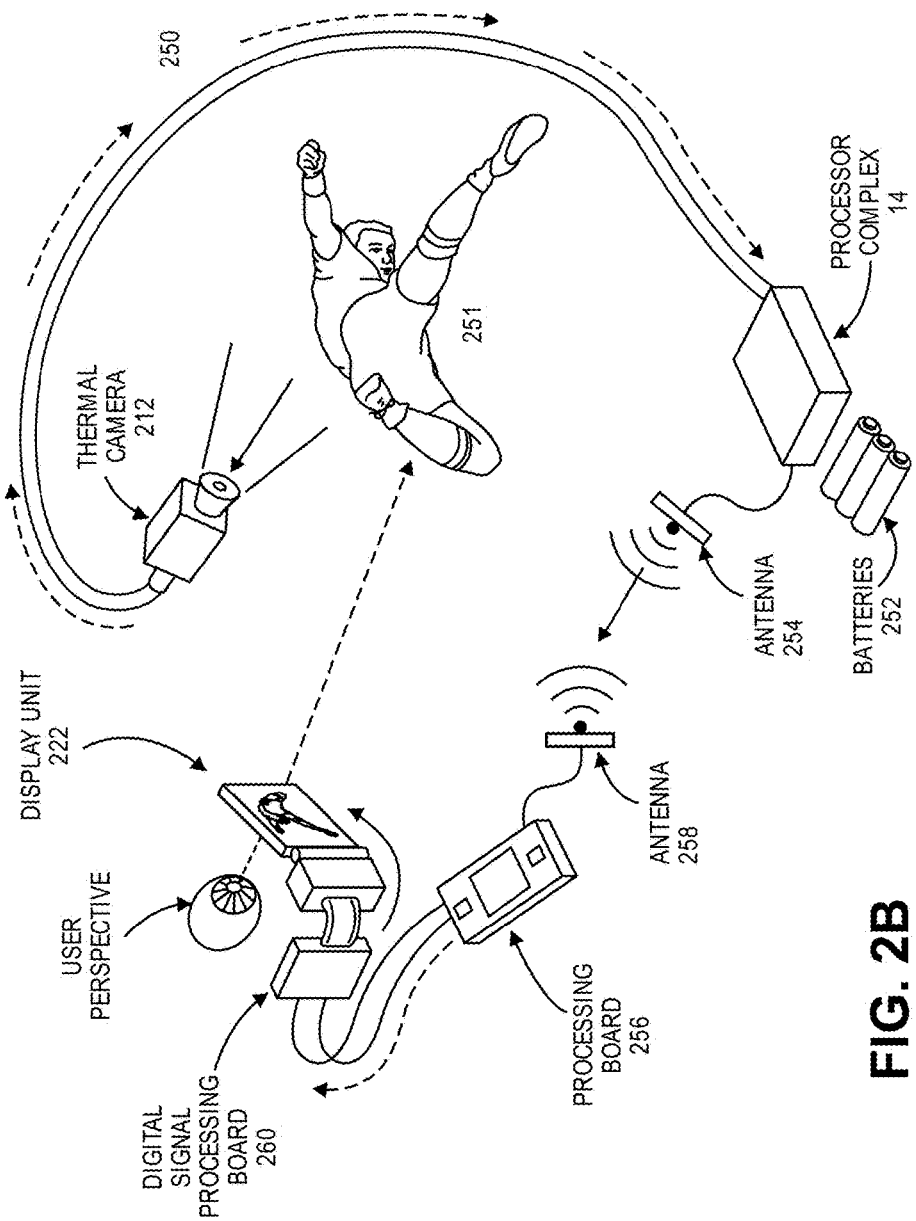

FIGS. 2A and 2B are diagrams illustrating components of the cognitive load reducing platform in the firefighting vision system embodiment. Referring to FIG. 2A, in one embodiment, the cognitive load reducing platform 200 comprises two components: i) an assisted perception module 221 integrated with a face mask 224 (or simply "mask") or helmet of the SCBA worn by each user/crewmember; and ii) a command and control interface 226 displayed on a remote display device 228 to a person of authority, such as an incident commander. The command and control interface 226 enables the person of authority to manage the incident and the crewmembers wearing respective assisted perception modules 221 by receiving and displaying the enhanced characterization data from each of the respective assisted perception modules. In a further embodiment, the command and control interface not only receives the enhanced characterization data from the assisted perception modules, but also transmits data and commands back to the assisted perception modules. The display device 228 of the incident commander is remote in the sense that the display device 228 is remote from the first responders responding to the incident, but is in proximity to the incident, such as near a firetruck or command center.

Each of the assisted perception modules 221 comprises a modular set of components including a sensor, shown here as TIC 212, a processor complex 214 in communication with the TIC 212 for executing an edge enhancement engine 220, and a display unit 222, which is removably attached to the mask 224. In relation to FIG. 1, the TIC 212 in FIG. 2A comprises one of the sensors 12 of the platform 200, the display unit 222 comprises the output device 22, and the edge enhancement engine 220 comprises the cognitive enhancement engine 20 executed on the processor complex 214.

In the embodiment shown, the display unit 222 may comprise an augmented reality (AR) display unit, a virtual reality (VR) display unit, or a head-mounted projection display unit. In the AR embodiment, the AR display unit may comprise optical see through glasses that can be either binocular or monocular, or optics integrated into the mask window. FIG. 2A shows an embodiment where the display unit 222 comprises an AR monocular display.

FIG. 2B is a diagram showing an exploded view of the assisted perception module 221 showing additional components in a wireless embodiment. The TIC 212 captures thermal image data of obstacles and objects 251 and sends the thermal image data via a cable 250 to the processor complex 14. The exploded view of the processor complex 14 shows that the processor complex 14 is powered by batteries 252 and the wireless communication interface 19 of FIG. 1 is coupled to an antenna 254 to wirelessly transmit the thermal image data to the display unit 222. The display unit 222 further includes a processing board 256 with an antenna 258 to receive the thermal image data wirelessly transmitted from the processor complex 14. The processing board 256 relays the thermal image data to a digital signal processing board 260, which processes the data for display on the display unit 222 directly in front of the user's eye.

As stated above, in one embodiment, the cognitive load reducing platform is a wearable electronic system. As such, there are many placement embodiments for the components of the cognitive load reducing platform. In most embodiments, all components are located on, or otherwise carried by, a user. For example, FIGS. 2A and 2B illustrate an embodiment where the TIC 212 (sensors 12) and the display unit 222 (output device 22) are carried by the user by virtue of being integrated with mask 224 (or a helmet). The processor complex 214 is also worn by the user, such as being clipped to a belt or clothing, stowed in a pouch or a pocket, or attached to a back frame of the SCBA.

In some embodiments, however, the sensors 12 and/or the processor complex 14 may be located remote from the user. As an example, consider the use case where a remote gas sensor controlled by a third party sends gas data over a network (e.g., Internet) to the cognitive load reducing platform 10. In this embodiment, the cognitive load reducing platform 10 may be implemented at least in part as a website or cloud service where the processor complex 14 is implemented as one or more servers that receives sensor data of various types. In this embodiment, the gas sensor data from the remote gas sensor is pushed to the processor complex 14 where the sensor data is processed locally by a corresponding cognitive enhancement engine 20, which converts and outputs a cognitively optimized visual format for display to the user on the display unit 22. In one embodiment, a third party could collect and push the gas sensor data into the cloud service.

Each of the assisted perception modules 221 may be configured with different numbers and types of sensors for particular use cases. The following is a nonexclusive list of use cases and sensor combinations. When responding to a nighttime search and rescue (SAR), the assisted perception module 221 may simply include a TIC to help locate hazards and victims. When responding to a hazmat incident, the assisted perception module 221 may include a gas monitor, a radioactivity monitor and a TIC. For navigating a dark structure, the assisted perception module 221 may include a TIC, a GPS and/or an IMU to identify location information, landmarks and safe zones. For investigating a collapsed building, the assist perception module 221 may use the TIC to detect edges of walls and to analyze orthogonality of the walls to detect structural changes, and seismic sensor to detect shaking.

To facilitate the use of different sensors, the mask 224 or a helmet may include a spring-loaded pin connector for removably attaching different types of sensors having connectors that are compatible with the spring-loaded pin connector. Accordingly, the user may snap in and out different types of sensors for easy substitution in the field as required. Once a sensor is attached (e.g., snapped in) the spring-loaded pin connector, the processor complex 214 may automatically identify the sensor type and load the corresponding cognitive enhancement engine 20 to process the sensor output for presentation on the output device. In another embodiment, the mass 224 or the helmet may include multiple connectors so that multiple sensors may be mounted and used at the same time.

There are also many communication embodiments for the components of the cognitive load reducing platform. For example, in the embodiment shown in FIGS. 2A and 2B, the TIC 212 communicates with the processor complex 214 over a wired connection via cable 250. However, in an alternative embodiment, the TIC 212 wirelessly communicates with the processor complex 14. In the embodiment shown in FIGS. 2A and 2B, the processor complex 214 communicates with the display unit over a wireless connection. However, in an alternative embodiment, the processor complex 214 communicates with the display unit over a wired connection. In yet a further embodiment, the TIC 212 and the processor complex 214 may be integrated together within a common housing, in which case the TIC 212 is in direct communication with the processor complex 214, and the communication between the processor complex 214 and the display unit 222 could be over a wired or wireless connection. In either embodiment, the display unit 222 would still communicate wirelessly with the central command display device 228.

In one embodiment, the display unit 222 (including digital signal processing board 260, processing board 256, and antenna 258) is mounted inside the mask 224. However, in an alternative embodiment, the display unit 222 is mounted outside the mask 224. For example, the display itself may be positioned outside the mask 224, while the digital signal processing board 260, processing board 256 and antenna 258, may be worn by the user, such as being clipped to a belt or clothing, stowed in a pouch or a pocket, or attached to a back frame of the SCBA.

According to one aspect of the disclosed embodiments, the edge enhancement engine 220 executed by the processor complex 214 in the firefighting embodiment performs high speed processing on the thermal images from the TIC 212 in real time into enhanced characterization data comprising a stream of wireframe images where edges of objects appearing in the thermal images have increased luminosity and contrast in relation to the thermal images. The display unit is worn in a line of sight of the user and electronically displays the enhanced characterization data, where the stream of the wireframe images appear as decluttered, enhanced line drawings to enable the user to see and navigate in obscure conditions, while reducing the cognitive load of the user. In one embodiment, the enhanced characterization data comprises a stream of AR/VR or wireframe images having enhanced the edges or outlines of objects that are projected on the display device in the user's field of view, so the user can see and effectively navigate in dark or smoke-filled environments without overwhelming the user's ability to process the displayed information. In this embodiment, the enhanced line drawing images produced by the platform dramatically enhance the user's ability to make well-informed decisions rapidly when operating in complex environments where cognitive abilities decline, such as a first responder (e.g., a fire fighter or search and rescue personnel).

FIGS. 3A and 3B are diagram illustrating example enhanced wireframe images displayed on the display unit 222. The enhanced wireframe images are shown on a transparent AR or head mounted projection display placed directly within the user's line of sight to provide real time navigation. The enhanced wireframe images of the disclosed embodiments have enhanced edges and a decluttered appearance after processing of thermal images/video by the cognitive load reducing platform. In other words, the enhanced images clarify the TIC video by highlighting key details with bright edges and minimizing the rest. Notice that the edge enhancement engine 220 is not optimized to recognize objects in the thermal images nor to create continuous lines outlining the objects, but is rather optimized to reduce visual complexity by filtering out faint elements and boosting contrast throughout the image. A close review of the enhanced wireframe images in FIGS. 3A and 3B reveals some or all the edges outlining objects may have small breaks and thus may not meet the mathematical definition of a continuous line, but when viewed by a human, the brain easily completes the scene and can recognize simple objects sufficiently enough to navigate. In an alternative embodiment, the edge enhancement engine 220 may create wireframe images having continuous lines outlining the objects.

The enhanced wireframe images overlaid in front of a user's eye in real time are designed to save lives by providing the user (e.g., a firefighter) with just the information the user needs, instead of overloaded the user as can be easily done in stressful situations. As shown, the assisted perception module 221 enables the user to see in dark, smoke-filled environments. However, seeing through smoke is a side benefit to the value of the cognitive load reducing platform, which is to reduce the visual complexity of hazardous environments, while allowing individuals to more easily make sense of their surroundings.

The Assisted Perception provided by the cognitive load reduction platform leverages the principles of neuroscience to enhance aggregated sensor data in real-time to allow first responders to do their jobs significantly faster and more safely. The closest competitor to an infrared sensor-based, extreme environment tool, would be the handheld or helmet mounted infrared camera and display systems. However, none of these systems offers any context-specific interpretive processing of the output, nor are they designed as true augmented reality interfaces that reduce the cognitive load of the user.

Referring again to FIG. 2A, the wireless capabilities of the processor complex 14 is also used create a shared experience between the crewmembers and the incident commander (IC) via the command and control interface 226. According to the present embodiment, the command and control interface 226 runs on the display device 228 to the incident commander and is associated or paired to a group of the assisted perception modules 221 worn by crewmembers. Through its wireless capabilities, each assisted perception module 221 streams its enhanced image to the command and control interface 226 on the display device 228 so that the incident commander can see in real time what the crewmembers see. Thus, the platform improves situational awareness on the front lines as well as to create a shared operating picture with the commander on the backend through a cognitive load reducing command and control interface 226 that aggregates information and presents insights to the commander via a simplified GUI based on similar principals of neuroscience.

FIG. 4 is a diagram illustrating an example command and control interface of the cognitive load reducing platform. In one embodiment, the display device 228 comprises a tablet computer or large mobile phone, and the command and control interface 226 comprises multiple sub-panels or frames to display the streams of the enhanced characterization data from each of the assisted perception modules 221 of the crewmembers (e.g., up to 8). There are two communication modes. In the first communication mode, the incident commander can select any subpanel to engage in audio or visual icon based communication. In the second communication mode, the incident commander can broadcast to all of the assisted perception modules 221 equipped crewmembers in the field. The assisted perception modules 221 may use high-performance GPUs and openGL ($\geq 3.3$) algorithms to render this interactive, multiple panel display.

Traditional emergency response tools to aid the incident commander focus upon the incident commander's ability to integrate information unavailable to the crewmembers, and to then communicate these insights via radio channels. In contrast, the cognitive load reducing platform allows the incident commander to see the moment to moment visual experience of their crewmembers and to communicate back to them using visual cues displayed to crewmembers equipped with assisted perception modules 221. Consequently, the connected nature of the platform (streaming visual data between assisted perception modules 221 to the central command display device 228) elevates the safety of the entire workspace by providing a shared operating picture between individuals in the field and leaders monitoring workers from the periphery.

According to the disclosed embodiments, the cognitive load reducing platform further includes several innovative features, as described below.

Referring again to FIGS. 2A and 2B, in the firefighting embodiment of edge enhancement engine 220 performs high speed processing on the thermal images from the TIC 212 to enhance the edges or outlines therein. In one embodiment, the edge enhancement engine 220 utilizes edge detection and histogram equalization algorithms designed to facilitate the human brain's ability to make rapid and accurate inferences related to navigation. The edge detection and histogram equalization algorithms reduced thermal image data to a simple "line drawing" that leverages the underlying neurostructure of vision to aid in navigation.

Figure 5:
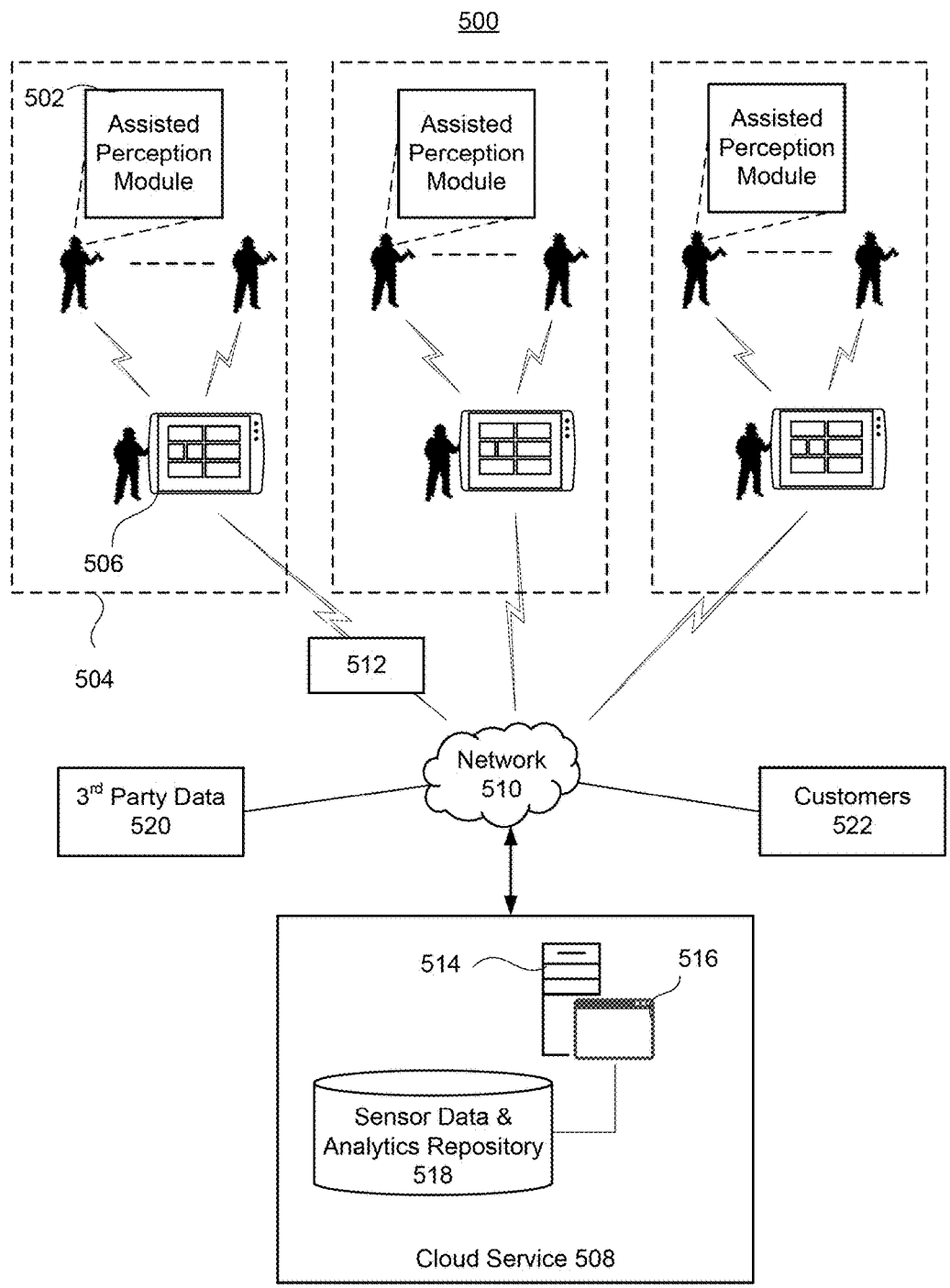
FIG. 5 is a diagram illustrating components of the cognitive load reducing platform in a backend data aggregation and analytics embodiment.

FIG. 5 is a diagram illustrating components of the cognitive load reducing platform in a backend data aggregation and analytics embodiment. In this embodiment, the cognitive load reducing platform 500 comprises three components: i) assisted perception modules 502 worn by each user/crewmember of a unit 504 responding to an incident; ii) the command and control interface device 506 controlled by the person of authority managing each of the units 504; and iii) a cloud service 508 in communication over a network 510 (e.g., the Internet) with the command and control interface device 506 of each of the units 504 to perform data aggregation, predictive analytics, and archiving and reporting services.

In operation, raw sensor data collected by one or more different types of sensors of the assisted perception modules 502 in each unit 504 is processed into one or more streams of enhanced characterization data. For example, in one embodiment, the assisted perception modules 502 perform edge detection for decluttering raw thermal images by highlighting contour and shape information necessary for efficient navigation and displays the resulting images as AR video. This assisted perception modules 502 in a unit 504 transmit telemetry data 512 in the form of one or more streams of enhanced characterization data (including the AR video) from different types of sensors and optionally the raw sensor data to the command and control interface device 506 of that unit 504. In an alternative embodiment, the telemetry data 512 may comprise only the raw sensor data for conversion by the cloud service 508 into enhanced characterization data.

The command and control interface device 506 receives telemetry data 512 from each of the assisted perception modules 502 and displays at least a portion of the streams of enhanced characterization data 512 to the person of authority. The command control interface device 506 also transmits the telemetry data 512, including the optional raw sensor data, to the cloud service 508. In one embodiment, the command and control interface device 506 may communicate with both the assisted perception modules 502 of a particular unit 504 and with the cloud service 508 using 5G cellular mobile communications.

In one embodiment, either the command and control interface device 506 or the cloud service 508 may aggregate the AR video from telemetry data 512 from multiple assisted perception modules 502 to construct a map of the interior of a structure in which the incident occurs. In addition, radiometric thermal data from the assisted perception modules 502 may be used to recognize variations in thermal dynamics specific to higher heat and such locations may be indicated on the map as hot spots. The map and optionally the hot spots may be returned from the command and control interface device 506 back to the assisted perception modules 5024 for display to the crewmembers. In a further embodiment, a virtual path marker may be displayed on the map to the crewmembers in an egocentric "first person" frame, the path they took to their current location in the structure. In one embodiment, display of the path is simplified to resemble a virtual path resembling a series of "breadcrumbs." This virtual path is designed to aid first responders looking to make a rapid egress.

One or more servers 514 of the cloud service 508 receives the telemetry data 512 and/or the raw sensor data transmitted by the command and control interface device 506. A data aggregation and analytics engine 516 executed by the one or more servers 514 performs data aggregation and analytics on the telemetry data 512, including the raw sensor data if present. In one embodiment, the data aggregation and analytics may be based artificial intelligence, such as machine learning (e.g., neural nets) and is capable of making predictions. The data aggregation and analytics engine 516 may also automatically archive the telemetry data 512 in a sensor data and analytics repository 518. Any analytical data generated is also stored in the sensor data and analytics repository 518. In one embodiment the sensor data and analytics repository 518 may comprise one or more databases distributed over one or more servers, local or remote.

In one embodiment, the telemetry data 512 collected and analyzed by the data aggregation and analytics engine 516 may further include third party data 520 collected over the network 510. For example, during a building fire, the data aggregation and analytics engine 516 may access maps, weather conditions, building schematics, time/date, and building control information from building management systems (BMS) building management systems that controls and monitors a building's mechanical and electrical equipment such as fire and security systems, power systems, ventilation, and lighting. Example of building control information may include fire alarm locations, room temperatures, elevator status, and the like. Collected third party information may then be associated with the sensor data and used for predictive analytics. The cloud service 508 may transmit any predictive analytics generated for a relevant incident to the command and control interface device 506 located at the incident location and optionally passed along to the crewmembers in the unit 540.

In one embodiment, the data aggregation and analytics engine 516 may use various aggregation approaches to combine the telemetry data 512 from assisted perception modules 502 and optionally the third-party information 520 for statistical analysis and predictive analytics. For example, the telemetry data 512 and third party information may be aggregated and searched according to: first responder unit, incident, first responder department, city, county, state, country, continent, and worldwide. In this sense, the cognitive load reducing platform utilizes first responders wearing the assisted perception modules 502 as mobile sensors for crowdsourced data collection. The data is collected over time with incident metadata to analyze trends.

In a further embodiment, the cloud service 508 may operate as a software as a service (SaaS) model whereby statistical data generated by the cloud service 508 may be made available to customers 522 of the cloud service. Examples of customers include insurance companies and fire departments, for example.

Figure 6:
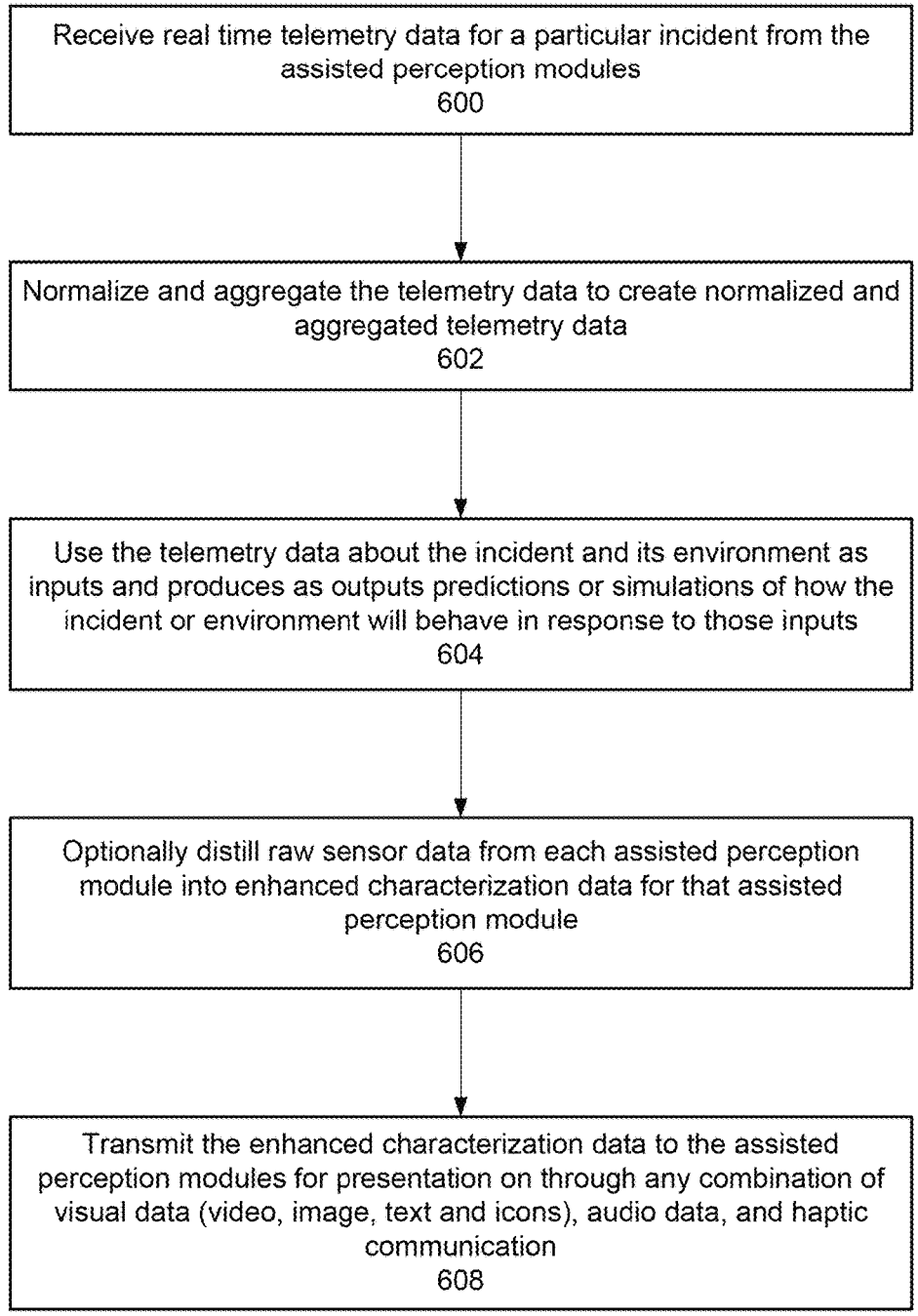
FIG. 6 is a flow diagram illustrating a data aggregation process performed by the data aggregation and analytics engine of the cloud service.

FIG. 6 is a flow diagram illustrating a data aggregation process performed by the data aggregation and analytics engine 516 of the cloud service 508. The process may begin by the data aggregation and analytics engine 516 receiving real time telemetry data 512 for a particular incident from the assisted perception modules 502, including any third party data 520 (block 600). The data aggregation and analytics engine 516 normalizes and aggregates the telemetry data 512 to create normalized and aggregated telemetry data (block 602). The normalized and aggregated telemetry data is then used to create a digital field of data or in other words a digital replica of the incident environment. One example of creating a digital replica is aggregating the video streams from the assisted perception modules 502 to create a map of the structure in which the incident occurred.

The data aggregation and analytics engine 516 uses the telemetry data about the incident and its environment as inputs and produces as outputs predictions or simulations of how the incident or environment will behave in response to those inputs (block 604). In the embodiment where the telemetry data 512 comprises only raw sensor data, the cloud service 508 may optionally distill the raw sensor data from each assisted perception module 502 into cognitively optimized enhanced characterization data for the corresponding assisted perception module (block 606). In one embodiment, as described above the enhanced characterization data is a reduced representation of the sensor data in a manner that reduces a cognitive load of the user. The enhanced characterization data is then transmitted to the assisted perception modules 502 for presentation through any combination of visual data (video, image, text and icons), audio data, and haptic communication (block 608).

As an example of predictive analytics, consider a firefighter responding to a house fire and entering a room equipped with assisted perception module having a radiometric TIC and a gas detector. Once the sensor data is received, the data aggregation and analytics engine 516 may be configured to recognize objects in the room, such as walls, doors, windows and furniture. The data aggregation and analytics engine 516 may be configured to predict a flashover flow path hazard by recognizing that smoke is entering a doorway and flowing towards the window and that an object in-between the door and window is emitting gas at a high rate, indicating a high probability of a flashover event. This flashover prediction may be forwarded to the incident commander and/or the firefighter to clear the room.

A method and system for implementing a cognitive load reducing platform has been disclosed. The present invention has been described in accordance with the embodiments shown, there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A cognitive load reducing platform, comprising:
   one or more sensors that collect information about an environment as sensor data;
   a processor complex comprising one or more processors in communication with the one or more sensors, wherein the one or more processors execute one or more software-based cognitive enhancement engines that process the sensor data from the one or more sensors into enhanced characterization data having a reduced amount of data compared to the sensor data;
   one or more output devices to electronically communicate the enhanced characterization data to a user such that the enhanced characterization data is integrated into natural senses of the user and optimized for the performance of a specific task of the user to reduce the cognitive load of the user, wherein at least one of the one or more sensors and at least one of the one or more output devices comprise an assisted perception module worn by the user during an incident to enable the user to navigate in dark or smoke-filled environments;
   a command and control interface displayed on a display device remote from the user to enable a person of authority to manage the incident and user by receiving and displaying the enhanced characterization data from the assisted perception module, and by transmitting data and commands back to the assisted perception module; and
   a cloud service in communication over a network with the command and control interface to perform at least one of data aggregation, predictive analytics, and archiving on telemetry data received from the command and control interface and the display device, the telemetry data comprising at least one of the sensor data and the enhanced characterization data, wherein one of the command and control interface and the cloud service aggregates the telemetry data from the assisted perception modules to construct a map of the interior of a structure in which the incident occurs.

2. The cognitive load reducing platform of claim 1, wherein multiple users are equipped with respective assisted perception modules, the command and control interface further comprising multiple sub-panels to display the enhanced characterization data from each of the assisted perception modules, wherein in a first communication mode, any of the subpanels is selected to engage in audio or visual icon based communication, and wherein in a second communication mode, the audio or visual icon based communication is broadcast to all of the assisted perception modules.

3. The cognitive load reducing platform of claim 1, wherein the map includes a location of hotspots and a virtual path marker showing paths the users took to a current location in the structure to aid in rapid egress.

4. The cognitive load reducing platform of claim 1, wherein the cloud service automatically archives the telemetry data in a repository.

5. The cognitive load reducing platform of claim 4, wherein the cloud service operates as a software as a service (SaaS) wherein statistical data generated by the cloud service is made available to customers of the cloud service.

6. The cognitive load reducing platform of claim 4, wherein, the cloud service aggregates the telemetry data and third party data collected over the network, the third party data including maps, weather conditions, building schematics, time/date, and building control information.

7. The cognitive load reducing platform of claim 6, wherein the cloud service aggregates the telemetry data and third party data according to any combination of: first responder unit, incident, first responder department, city, county, state, country, continent, and worldwide for crowdsourced data collection.

8. The cognitive load reducing platform of claim 1, wherein the processor complex is one of part of the assisted perception module and located on a remote server.

9. The cognitive load reducing platform of claim 1, wherein the assisted perception module is integrated with a mask or helmet of a self-contained breathing apparatus (SCBA), and wherein the sensor comprise a thermal imaging camera (TIC) and the one or more cognitive enhancement engines executed by the processor comprises one or more edge enhancement engines to processes thermal images from the TIC to enhance the edges of objects and declutter information in the thermal images.

10. A method comprising:
collecting, using one or more sensors, information about an environment as sensor data;
executing, by one or more processors in communication with the one or more sensors, one or more software-based cognitive enhancement engines that process the sensor data from the one or more sensors into enhanced characterization data having a reduced amount of data compared to the sensor data;
electronically communicating, using one or more output devices, the enhanced characterization data to a user such that the enhanced characterization data is integrated into natural senses of the user and optimized for the performance of a specific task of the user to reduce the cognitive load of the user, wherein at least one of the one or more sensors and at least one of the one or more output devices comprise an assisted perception module worn by the user during an incident to enable the user to navigate in dark or smoke-filled environments; and
displaying a command and control interface on a display device remote from the user to enable a person of authority to manage the incident and user by receiving and displaying the enhanced characterization data from the assisted perception module, and by transmitting data and commands back to the assisted perception module; and
transmitting telemetry data from the command and control interface and the display device to a cloud service in communication over a network with the command and control interface to perform at least one of data aggregation, predictive analytics, and archiving on the telemetry data, the telemetry data comprising at least one of the sensor data and the enhanced characterization data, wherein one of the command and control interface and the cloud service aggregates the telemetry data from the assisted perception modules to construct a map of the interior of a structure in which the incident occurs.

11. The method of claim 10, further comprising: using, by multiple users, respective assisted perception modules, and configuring the command and control interface with multiple sub-panels to display the enhanced characterization data from each of the assisted perception modules, wherein in a first communication mode, any of the subpanels is selected to engage in audio or visual icon based communication, and wherein in a second communication mode, the audio or visual icon based communication is broadcast to all of the assisted perception modules.

12. The method of claim 10, further comprising: including on the map a location of hotspots and a virtual path marker showing paths the users took to a current location in the structure to aid in rapid egress.

13. The method of claim 10, further comprising: automatically archiving the telemetry data in a repository by the cloud service.

14. The method of claim 13, further comprising: operating the cloud service as a software as a service (SaaS) wherein statistical data generated by the cloud service is made available to customers of the cloud service.

15. The cognitive load reducing platform of claim 13, further comprising: aggregating, by the cloud service, the telemetry data and third party data collected over the network, the third party data including maps, weather conditions, building schematics, time/date, and building control information.

16. The cognitive load reducing platform of claim 15, further comprising aggregating, by the cloud service, the telemetry data and third party data according to any combination of: first responder unit, incident, first responder department, city, county, state, country, continent, and worldwide for crowdsourced data collection.

17. An executable software product stored on a non-transitory computer-readable medium containing program instructions for reducing cognitive load of a user, the program instructions for:
collecting, using one or more sensors, information about an environment as sensor data;
processing, by one or more cognitive enhancement engines the sensor data from the one or more sensors into enhanced characterization data having a reduced amount of data compared to the sensor data;

electronically communicating, using one or more output devices, the enhanced characterization data to a user such that the enhanced characterization data is integrated into natural senses of the user and optimized for the performance of a specific task of the user to reduce the cognitive load of the user, wherein at least one of the one or more sensors and at least one of the one or more output devices comprise an assisted perception module worn by the user during an incident to enable the user to navigate in dark or smoke-filled environments; and displaying a command and control interface on a display device remote from the user to enable a person of authority to manage the incident and user by receiving and displaying the enhanced characterization data from the assisted perception module, and by transmitting data and commands back to the assisted perception module; and transmitting telemetry data from the command and control interface and the display device to a cloud service in communication over a network with the command and control interface to perform at least one of data aggregation, predictive analytics, and archiving on the telemetry data, the telemetry data comprising at least one of the sensor data and the enhanced characterization data, wherein one of the command and control interface and the cloud service aggregates the telemetry data from the assisted perception modules to construct a map of the interior of a structure in which the incident occurs.

18. The non-transitory computer-readable medium of claim 17, further comprising: a cloud service in communication over a network with the command and control interface to perform data aggregation, predictive analytics, and archiving on one or more of the sensor data and the enhanced characterization images.

* * * * *